United States Patent Office 3,361,948
Patented Jan. 2, 1968

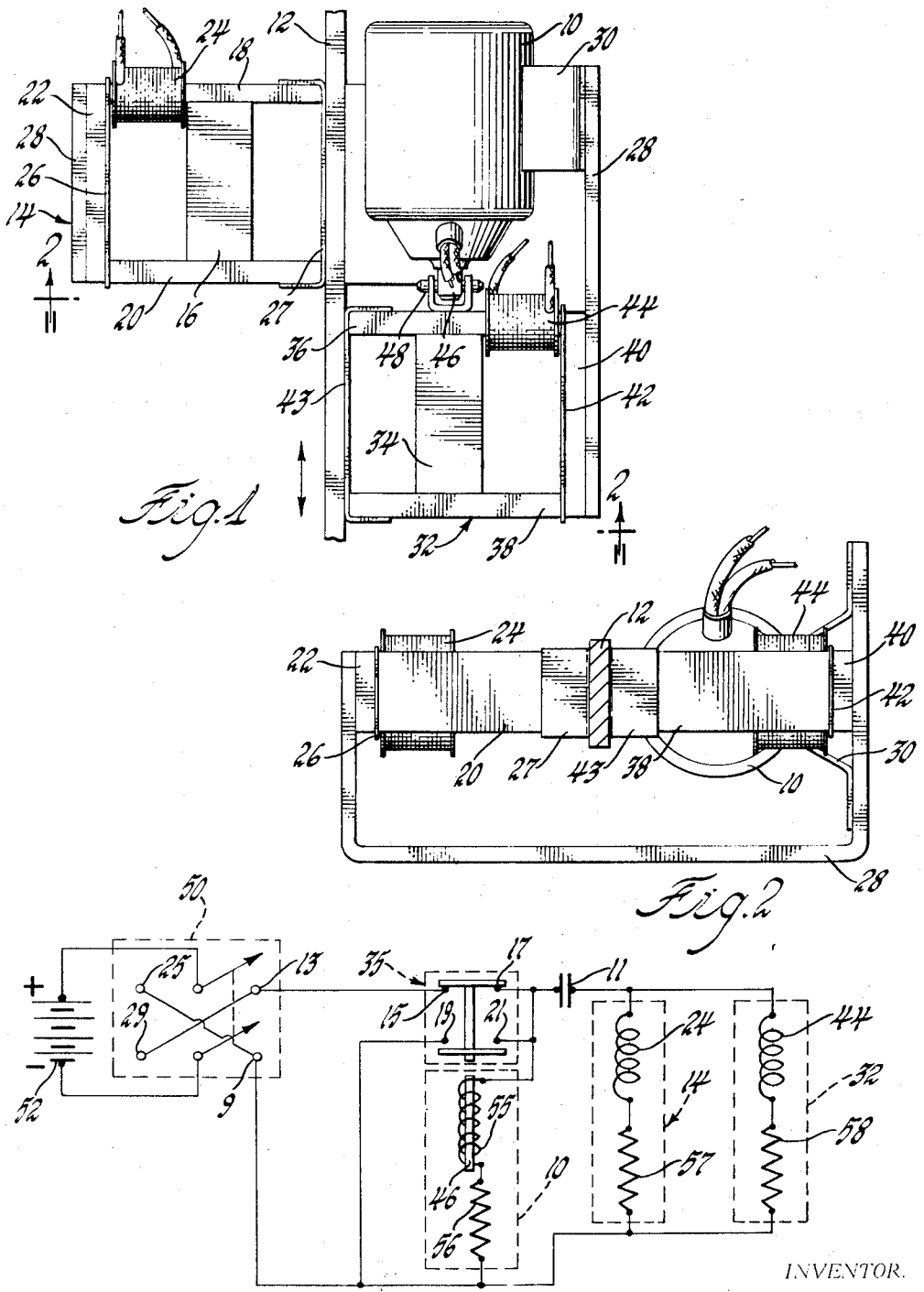

3,361,948
ELECTROMECHANICAL BI-DIRECTIONAL
MOTION ACTUATOR DEVICE
Elbert M. Sawyer, Anderson, Ind., assignor to General
Motors Corporation, Detroit, Mich., a corporation of
Delaware
Filed May 28, 1965, Ser. No. 459,857
7 Claims. (Cl. 318—130)

ABSTRACT OF THE DISCLOSURE

An electromechanical bi-directional motion actuator device having a single electric solenoid mechanically connected to a magnetic clutch to move the magnetic clutch in a first direction upon energization of the solenoid and to move the clutch in the opposite direction by a solenoid plunger return spring upon de-energization of the solenoid.

---

This invention relates to actuator devices and, more specifically, to electromechanical bi-directional actuator devices.

With most linear motion devices, the motion of the power member is transmitted to a work member, having at least one serrated edge, by mechanical ratchet devices which are arranged to engage the serrations in the work member and, therefore, function as mechanical clutches. To maintain the work member in its last position, as the power member returns in preparation for another power stroke in the same direction, ratchet type holding devices which are also arranged to engage the serrations are usually employed. To return the work member to its original position at the limit of its movement in one direction, these ratchet devices must be removed from the path of the serrated edge of the work member, thereby permitting this member to be returned in the opposite direction to its original starting position.

If the work member is to be driven in the reverse direction, another set of ratchets engaging another row of oppositely pitched serrations on the work member and, possibly, another power member are required.

The mechanical linkages of these devices are cumbersome, and frequent breakage of the ratchets or the stripping of serrations in the work member, necessitating replacement or repair, is common. Therefore, most of the disadvantages of mechanisms of this type may be overcome by simplifying the mechanical linkages and eliminating the mechanical ratchet clutch and hold arrangements.

It is, therefore, an object of this invention to provide an improved bi-directional motion actuator device.

It is another object of this invention to provide an improved bi-directional motion actuator device with simplified mechanical linkage and magnetic clutch and holding devices.

In accordance with this invention, an electromechanical, bi-directional motion actuator device is provided wherein a magnetic clutch device and a magnetic holding device, both selectively operable to a condition to engage and a condition to release, are located in cooperative relationship with a work member of magnetic material which is constrained to be moved either one of two directions by a power member, characterized by the ability to produce power strokes in a first and a second direction, which drives the magnetic clutch device. A direction of motion determining arrangement may, as selected, operate the clutch device to a condition to engage and the holding device to a condition to release the work member at the beginning of each first direction power stroke or operate the clutch device to a condition to release and the holding device to a condition to engage the work member at the beginning of each first direction power stroke and in either mode to reverse the operating condition of both the clutch and holding devices before the beginning of each second direction power stroke whereby the work member may be selectively moved in a first direction or a second direction, respectively.

For a better understanding of the present invention, together with additional objects, advantages and features thereof, reference is made to the following description and accompanying drawings in which:

FIGURE 1 is a front elevation view of the novel actuator device of this invention, FIGURE 2 is another view of the novel actuator device of this invention taken along line 2—2 of FIGURE 1 and looking in the direction of the arrows, and FIGURE 3 is a schematic diagram of the actuating and direction of motion determining circuitry which may be used with the actuator device of FIGURES 1 and 2.

To obtain the required "ratchet action" with magnetic devices, this novel actuator device employs the well-known permanent magnet flux transfer principle. That is, in a divided magnetic circuit, if the flux is once divided unequally in the two branches, it will remain so until another magnetomotive force acts to produce a different division. If two soft magnetic steel keepers are placed across the pole pieces of a permanent magnet, the magnetic force holding the first placed keeper across the pole pieces is much greater than that holding its later placed companion. If, with both keepers in place, the one held by the greater magnetic force is removed, this greater magnetic holding force is transferred to the other and this condition remains unchanged until the keeper held by the greater magnetic force is removed. The last applied keeper, therefore, is always held by a magnetic force of a magnitude less than that holding the first applied keeper regardless of the number of times it is placed across the poles and then removed. Not only does this arrangement respond to mechanical switching, the removing and replacing of the keepers, but it may also be electrically switched. This involves winding an electrical switching coil around one of the pole pieces and pulsing a current therethrough in such a direction that the electromagnetic field thereby produced results in a flow of magnetic flux which tends to increase the amount of flux flowing through the weaker leg of the magnetic circuit. This principle is discussed on page 6 of the Feb. 14, 1963, issue of the "Machine Design" publication.

As with all motion producing devices, it is necessary that a work member be provided to which external devices may be connected. Without inferring a limitation thereto, examples of work members are armatures and rotors of electric motors, plungers of electrical solenoids and crank shafts of internal combustion engines.

In the actuator device of this invention, this work member may be a bar of magnetic material 12 located by guide members, not shown in the interest of reducing drawing complexity, which permit motion of the work member only in the first and second directions as indicated by the double headed arrow in FIGURE 1. It is to be specifically understood, however, that the shape of this work member is not to be limited to that of rectangular cross section. In fact, this work member may be a disc which may be rotated by the actuator device of this invention if it were placed some distance from the center thereof as will presently become apparent. Although the double headed arrow of FIGURE 1 indicates vertical motion, this device may be used to produce bi-directional motion in any position.

To produce the necessary bi-directional motion, a power member characterized by the ability to produce first and second direction power strokes may be used. One example of a power member possessing these characteristics is an electrical solenoid 10. A power stroke in a first direction is produced by the energized coil, not shown, acting upon the plunger 46 and the second direction power stroke is produced by a spring which returns the solenoid plunger to its original position. It is to be specifically understood that the use of a solenoid as the power member is illustrative only as other suitable power members having similar characteristics may be used without departing from the spirit of the invention.

The plunger 46 of solenoid 10 in FIGURE 1 is shown to be at the end or limit of the power stroke, in the first direction, produced by the energized coil. Located within the solenoid case and positioned to engage the opposite end of the solenoid plunger 46 is a compression type spring member which is compressed by the motion of plunger 46. Upon the deenergization of the coil, plunger 46 is released by the magnetic field and this expanding spring forces plunger 46 through a power stroke in the opposite or second direction. Solenoids with this type spring return feature are commonly used with applications which do not permit external springs, therefore, this arrangement is well known in the art. In the interest of drawing clarity, therefore, this compression type plunger return spring has not been shown.

A magnetic holding device assembly, generally shown at 14, is located in cooperative relationship with work member 12 for selectively holding work member 12 in its last position. This magnetic holding device assembly is comprised of a permanent magnet 16 having two soft magnetic steel pole pieces 18 and 20, a permanent keeper member 22 and a switching coil 24 wound about pole piece 18 for supplying the external magnetomotive force required to change the condition of operation of this assembly in a manner to be later described. Work member 12 serves as the other keeper of the magnetic circuit of permanent magnet 16. To aid the switching operation or the reversal of condition of operation of this device, shims of non-magnetic material 26 and 27 may be placed between pole pieces 18 and 20 and the keeper 22 and work member 12, respectively, as indicated in FIGURE 1.

The magnetic holding device assembly 14 and power member 10 are secured rigidly to and supported by a frame member 28. These assemblies may be secured to frame member 28 by any convenient method, for example, the bracket member 30 supporting solenoid 10. If convenient, these devices may be spot welded or bolted to frame 28.

A magnetic clutch device assembly, generally shown at 32, is also located in cooperative relationship with work member 12 for selectively transferring the motion of power member 10 to work member 12. This magnetic clutch assembly is comprised of a permanent magnet 34 having two soft magnetic steel pole pieces 36 and 38, a permanent keeper member 40 and a switching coil 44 wound about pole piece 36 for supplying the external magnetomotive force required to change the condition of operation of this assembly in a manner to be later described. Work member 12 serves as the other keeper of the magnetic circuit of permanent magnet 34. For the same reason as set forth in regard to clutch assembly 14, shims of non-magnetic material 42 and 43 may be placed between the pole pieces 36 and 38 and the keeper 40 and work member 12, respectively, of this assembly.

The magnetic clutch assembly 32 may be located within guide members, not shown in the interest of drawing clarity, which permit movement thereof in the same directions as that of work member 12. The magnetic clutch assembly 32 is mechanically connected to and, therefore, driven by, the plunger 46 of power member solenoid 10 through a yoke and pin arrangement 48.

Holding assembly 14 and clutch assembly 32 are selectively operable to a condition to engage and to a condition to release work member 12 by energizing switching coils 24 and 44 with selected direction electrical direct currents, in a manner to be later described.

An actuating device, operable to a first position and a second position for actuating this device to move work member 12 in a first direction and a second direction, respectively, is necessary. Since the power member selected to illustrate the features of this invention is an electric solenoid 10, for purposes of this specification this actuating device may be a conventional double pole-double throw switch 50 connected to function as a reversing switch between the power member energizing source, herein shown as a conventional battery 52, and the actuating and direction of motion determining circuitry, as shown in FIGURE 3. It is to be specifically understood that other suitable actuating devices may be employed with different power members, the only requirement being that they are compatible. Similarly, the energizing source has been shown to be a source of direct current electricity, however, other energizing sources compatible with this or other selected power members may also be employed.

So that work member 12 may be selectively moved in a first direction or in a second direction, it is necessary that a direction of motion determining provision be made. As the power member selected to illustrate the features of this invention and this specification is an electrical solenoid 10, the direction of motion determining arrangement may be an electrical circuit as schematically set forth in FIGURE 3.

This circuitry is responsive to the operation of the actuating device switch 50 to the first position to operate the clutch device 32 to the condition to engage and the holding device 14 to the condition to release work member 12 at the beginning of each first direction power stroke and to the operation of actuating switch 50 to the second position to operate clutch device 32 to the condition to release and the holding device 14 to the condition to hold work member 12 at the beginning of each first direction power stroke.

Included in this direction of motion determining circuitry is a capacitor 11 which operates to reverse the operating condition of the clutch device 32 and the holding device 14 before the beginning of each second direction power stroke. The detailed operation of this circuitry will be brought out later in this specification.

With the movable blades of actuating switch 50 operated to the first position at which contact is established with stationary contacts 9 and 13 thereof, a circuit is established whereupon current flows from source 52 through the coil 55 of power member solenoid 10, the switching solenoids 24 and 44 of holding device 14 and clutch device 32, respectively, and charges capacitor 11.

Switching coil 24 of holding device 14 is wound in such a direction that the electromagnetic field produced by this current flow is in a direction which tends to increase the amount of magnetic flux flowing through keeper 22. Therefore, the greater portion of the magnetic flux produced by permanent magnet 16 is transferred to keeper 22 and magnetic holding device 14 is operated to the condition to release work member 12.

Switching coil 44 of clutch device 32 is wound in such a direction that the electromagnetic field produced by this current flow is in a direction which tends to increase the amount of magnetic flux flowing through work member 12. Therefore, the greater portion of the magnetic flux produced by permanent magnet 34 is transferred to work member 12 and magnetic clutch device 32 is operated to the condition to engage work member 12.

As the current flow through the coil of solenoid 10 increases to a value to produce sufficient magnetomotive force to operate plunger 46, plunger 46 is pulled in a direction toward the solenoid coil through a first direction power stroke. As magnetic clutch device 32 is mechanically connected to plunger 46, it is driven thereby in an upward direction, as looking at FIGURE 1. As magnetic clutch device 32 is now operated to the condition to engage work member 12, this motion is transferred thereto and work member 12 is moved in the first direction.

As with the compression type plunger return spring feature previously described, the operation of an electrical switch or switches by a solenoid plunger is a common expedient well known in the art. With this application, a conventional, commercially available electric switch having a pair of normally open and a pair of normally closed contacts operated by an arm or plunger may be mounted upon this device and positioned such that its operating arm or plunger is engaged and operated by solenoid plunger 46 at or near the end of each first direction power stroke. In the interest of drawing clarity, this switch has not been shown in FIGURES 1 and 2, however, it is schematically shown at 35 in FIGURE 3 as will be presently brought out.

At or near the end of its travel, solenoid plunger 46 engages the operating arm or plunger of the solenoid operated switch 35, positioned as described in the previous paragraph, which operates to break normally closed contacts 15 and 17 and to establish normally open contacts 19 and 21 thereof.

The contacts of this switch are arranged in such a manner that normally open contacts 19 and 21 are closed slightly after the opening of normally closed contacts 15 and 17. With normally open contacts 19 and 21 closed, a circuit is established for capacitor 11 to discharge through switching coils 24 and 44 and with normally closed contacts 15 and 17 open, energizing source 52 is removed from the coil of solenoid 10.

The current flow produced by capacitor 11 discharging through switching coils 24 and 44 is, of course, in a direction opposite the current flow which charged capacitor 11 and switched holding device 14 and clutch device 32 to the condition to release and the condition to engage work member 12, respectively, upon the closure of switch 50 to contacts 9 and 13, as previously described. Therefore, the electromagnetic fields produced by this reverse direction current flowing through switching coils 24 and 44 tends to increase the amount of magnetic flux flowing through work member 12 of the magnetic circuit of holding device 14 and in keeper 40 of clutch device 32, respectively.

The magnetomotive force produced in switching coil 24 of holding device 14 by the current flow from discharging capacitor 11 operates this device to the condition to engage work member 12 as the greater portion of the magnetic flux produced by permanent magnet 16 is transferred to work member 12.

The magnetomotive force produced in switching coil 44 of clutch device 32 by the current flow from discharging capacitor 11 operates this device to the condition to release work member 12 as the greater portion of the magnetic flux produced by permanent magnet 34 is transferred to keeper 40.

As enerigizing source 52 is removed from the coil of solenoid 10 upon the opening of normally closed contacts 15 and 17, the magnetomotive force produced by this coil collapses, releasing plunger 46. Therefore, the compressed plunger return spring may expand and drive plunger 46 through the second direction power stroke.

During this second direction power stroke, work member 12 is held in position by magnetic holding device 14, operated to engage work member 12, while magnetic clutch member 32, operated to release work member 12, is freely moved by plunger 46 to its original position preparatory to the beginning of another power stroke in the first direction.

As plunger 46 is driven by the compression type plunger return spring, plunger 46 disengages the operating arm of the solenoid operated switch 35, operating normally open contacts 19 and 21 open and normally closed contacts 15 and 17 closed. With normally open contacts 19 and 21 open, the discharging circuit for capacitor 11 is interrupted and with normally closed contacts 15 and 17 closed, the energizing circuits for the coil 55 of solenoid 10 and switching coils 24 and 44 and the charging circuit for capacitor 11 is re-established.

Although the energizing circuit for the solenoid coil 55 and the switching coils 24 and 44 is re-established as plunger 46 begins its second direction power stroke, the time constants of these circuits, as introduced by respective series resistors 56, 57 and 58, permits plunger 46 to complete the second direction power stroke before the current flowing therethrough increases to an effective magnitude. Therefore, the compression type plunger return spring drives plunger 46 completely through each second direction power stroke.

Upon the re-establishment of this circuit by closed contacts 15 and 17, capacitor 11 again begins to charge, the current through switching coils 24 and 44 operates holding device 14 to the condition to release and clutch device 32 to the condition to engage work member 12, respectively, as has been hereinbefore described, and the current flow through solenoid coil 55 produces the magnetomotive force which drives plunger 46 through another first direction power stroke. As holding device 14 is now operated to the condition to release and clutch device 32 operated to the condition to engage work member 12, this member is again moved in the first direction with this first direction power stroke of plunger 46.

At the conclusion of this first direction power stroke, the solenoid operated switch 35 is operated to again close normally open contacts 19 and 21 and open normally closed contacts 15 and 17. Therefore, capacitor 11 again operates to reverse the operating condition of holding device 14 and clutch device 32 and the compression type plunger return spring drives plunger 46 through another second direction power stroke during which work member 12 is held in position by holding device 14 and clutch device 32 is freely returned through this second direction power stroke with plunger 46.

As long as the movable blades of actuator switch 50 are maintained in contact with stationary contacts 9 and 13 thereof, these cycles are self-perpetuating and work member 12 is moved only in the first direction.

With the movable blades of actuating switch 50 operated to the second position at which contact is established with stationary contacts 25 and 29, a circuit is established whereupon current flows from source 52 through the coil 55 of solenoid 10, the switching coils 24 and 44 and charges capacitor 11, as previously described.

However, the direction of current flow is reversed by actuating switch 50 in this position, therefore, the electromagnetic field produced by switching coil 24 of holding device 14 is in a direction which tends to increase the amount of magnetic flux flowing through work member 12 and holding device 14 is operated to the condition to engage work member 12, as the greater portion of the magnetic flux produced by permanent magnet 16 is transferred to work member 12.

The substantially simultaneous current flow through switching coil 44 of clutch device 32 produces an electromagnetic field in a direction which tends to increase the amount of magnetic flux flowing through keeper 40, therefore, clutch device 32 is operated to the condition to release work member 12 as the greater portion of the magnetic flux produced by permanent magnet 34 is transferred to keeper 40.

As the current flow through coil 55 of solenoid 10 increases to a value to produce sufficient magnetomotive force to operate solenoid plunger 46, plunger 46 is pulled through a first direction power stroke. Since holding device 14 is now operated to the condition to engage and clutch device 32 is now operated to the condition to release work member 12, work member 12 is held by holding device 14 and clutch device 32 is moved freely with solenoid plunger 46 through the first direction power stroke.

At or near the end of its travel, solenoid plunger 46 again engages the operating arm or plunger of the solenoid operated switch 35 which operates to break normally closed contacts 15 and 17 and to establish normally open contacts 19 and 21 thereof, as previously described.

With normally open contacts 19 and 21 closed, a circuit is established for capacitor 11 to discharge through switching coils 24 and 44 and with normally closed contacts 15 and 17 open, energizing source 52 is removed from the coil of solenoid 10.

The current flow produced by capacitor 11 discharging through switching coils 24 and 44 is, of course, in a direction opposite the current flow which charged capacitor 11 and switched holding device 14 and clutch device 32 to the condition to engage and the condition to release work member 12, respectively, upon the closure of switch 50 to stationary contacts 25 and 29, as previously described. Therefore, the electromagnetic fields produced by this reverse direction current flowing through switching coils 24 and 44 tends to increase the amount of magnetic flux flowing through keeper 22 of holding device 14 and in work member 12 of the magnetic circuit of clutch device 32, respectively.

The magnetomotive force produced in switching coil 24 of holding device 14 by the current flow from discharging capacitor 11 operates this device to the condition to release work member 12 as the greater portion of the magnetic flux produced by permanent magnet 16 is transferred to keeper 22.

The magnetomotive force produced in switching coil 44 of clutch device 32 by the current flow from discharging capacitor 11 operates this device to the condition to engage work member 12 as the greater portion of the magnetic flux produced by permanent magnet 34 is transferred to work member 12.

As energizing source 52 is removed from the coil of solenoid 10 upon the opening of normally closed contacts 15 and 17, the magnetomotive force produced by this coil collapses, releasing plunger 46. Therefore, the compressed plunger return spring may expand and drive plunger 46 through the second direction power stroke.

During this second direction power stroke, work member 12 is released by holding device 14, operated to release work member 12, while magnetic clutch member 32, operated to engage work member 12, transfers the motion of plunger 46 and work member 12 is moved therewith through the second direction power stroke.

As plunger 46 is driven by the compression type plunger return spring, plunger 46 disengages the operating arm of the solenoid operated switch 35, operating normally open contacts 19 and 21 open and normally closed contacts 15 and 17 closed. With normally open contacts 19 and 21 open, the discharging circuit for capacitor 11 is interrupted and with normally closed contacts 15 and 17 closed, the energizing circuits for the coil 55 of solenoid 10 and switching coils 24 and 44 and the charging circuit for capacitor 11 is re-established.

Upon the re-establishment of this circuit by closed contacts 15 and 17, capacitor 11 again begins to charge, the current through switching coils 24 and 44 operates holding device 14 to the condition to engage and clutch device 32 to the condition to release work member 12, respectively, as has been hereinbefore described, and the current flow through solenoid coil 55 produces the magnetomotive force which drives plunger 46 through another first direction power stroke. As holding device 14 is now operated to the condition to release work member 12, this member remains in position through this first direction power stroke of plunger 46.

At the conclusion of this first direction power stroke, the solenoid operated switch 35 is operated to again close normally open contacts 19 and 21 and open normally closed contacts 15 and 17. Therefore, capacitor 11 again operates to reverse the operating condition of holding device 14 and clutch device 32 and the compression type plunger return spring drives plunger 46 through another second direction power stroke during which work member 12 is released by holding device 14 and, therefore, is returned through this second direction power stroke with plunger 46 by clutch device 32.

As long as the movable blades of actuator switch 50 are maintained in contact with stationary contacts 25 and 29 thereof, these cycles are self-perpetuating and work member 12 is moved only in the second direction.

From the foregoing description, it is apparent that the novel actuator device of this invention will selectively move the work member in respective first and second directions.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. An electromechanical bi-directional motion actuator device comprising a movable work member of a magnetic material, a magnetic clutch device and a magnetic holding device each located in cooperative relationship with said work member and selectively operable to a condition to engage and to a condition to release said work member, a power member characterized by the ability to produce first and second direction power strokes for driving said magnetic clutch device, actuating means operable to a first and a second position for activating said actuator device to move said work member in a first and a second direction, respectively, direction of motion determining means responsive to the operation of said actuating means to said first position to operate said clutch device to the condition to engage and said holding device to the condition to release said work member and responsive to the operation of said actuating means to said second position to operate said clutch device to the condition to release and said holding device to the condition to engage said work member at the beginning of each of said first direction power strokes and means included in said direction of motion determining means operable to reverse the operating condition of said clutch device and said holding device before the beginning of each of said second direction power strokes.

2. An electromechanical bi-directional motion actuator device comprising a source of electrical power, a movable work member of a magnetic material, a magnetic clutch device and a magnetic holding device each located in cooperative relationship with said work member and selectively operable to a condition to engage and to a condition to release said work member, a power member characterized by the ability to produce first and second direction power strokes for driving said magnetic clutch device, a switch operable to a first and a second position for activating said actuator device to move said work member in a first and a second direction, respectively, direction of motion determining circuitry responsive to the operation of said switch to said first position to operate said clutch device to the condition to engage and said holding device to the condition to release said work member and responsive to the operation of said switch to said second position to operate said clutch device to the condition to release and said holding device to the condition to engage said work member at the beginning of each of said first direction power strokes and means included in said direction of motion determining circuitry operable to reverse the operating condition of said clutch device and said holding device before the beginning of each of said second direction power strokes.

3. An electromechanical bi-directional motion actuator device comprising a source of electrical power, a movable work member of a magnetic material, a magnetic clutch device and a magnetic holding device each located in cooperative relationship with said work member and selectively operable to a condition to engage and to a condition to release said work member, a power member characterized by the ability to produce first and second direction power strokes for driving said magnetic clutch device, switch means operable to a first and a second position for activating said actuator device to move said work member in a first and a second direction, respectively, direction of motion determining circuitry responsive to the operation of said switch means to said first position to operate said clutch device to the condition to engage and said holding device to the condition to release said work member and responsive to the operation of said switch means to said second position to operate said clutch device to the condition to release and said holding device to the condition to engage said work member at the beginning of each of said first direction power strokes and a capacitor included in said direction of motion determining circuitry operable to reverse the operating condition of said clutch device and said holding device before the beginning of each of said second direction power strokes.

4. An electromechanical bi-directional motion actuator device comprising a source of electrical power, a movable work member of a magnetic material, a magnetic clutch device and a magnetic holding device each located in cooperative relationship with said work member and selectively operable to a condition to engage and to a condition to release said work member, a solenoid member characterized by the ability to produce first and second direction power strokes when energized for driving said magnetic clutch device, switch means operable to a first and a second position for establishing a solenoid member energizing circuit thereby activating said actuator device to move said work member in a first and a second direction, respectively, direction of motion determining circuitry responsive to the operation of said switch means to said first position to operate said clutch device to the condition to engage and said holding device to the condition to release said work member and responsive to the operation of said switch means to said second position to operate said clutch device to the condition to release and said holding device to the condition to engage said work member at the beginning of each of said first direction power strokes and capacitor means included in said direction of motion determining circuitry operable to reverse the operating condition of said clutch device and said holding device before the beginning of each of said second direction power strokes.

5. An electromechanical bi-directional motion actuator device comprising a source of electrical power, a movable work member of a magnetic material, a magnetic clutch device and a magnetic holding device each located in cooperative relationship with said work member and selectively operable to a condition to engage and to a condition to release said work member, a solenoid member characterized by the ability to produce first and second direction power strokes upon being energized by said electrical power source and by a plunger return spring, respectively, for driving said magnetic clutch device, a switch operable to a first and a second position for establishing a solenoid member energizing circuit to move said work member in a first and a second direction, respectively, direction of motion determining means responsive to the operation of said switch to said first position to operate said clutch device to the condition to engage and said holding device to the condition to release said work member and responsive to the operation of said switch to said second position to operate said clutch device to the condition to release and said holding device to the condition to engage said work member at the beginning of each of said first direction power strokes and means included in said direction of motion determining means operable to reverse the operating condition of said clutch device and said holding device and to interrupt the said solenoid member energizing circuit before the beginning of each of said second direction power strokes.

6. An electromechanical bi-directional motion actuator device comprising a source of electrical power, a solenoid member characterized by the ability to produce first direction power strokes when energized and second direction power strokes when de-energized, a movable work member of a magnetic material, a magnetic clutch device selectively operable to a condition to engage and to a condition to release said work member for selectively transferring the motion of said solenoid member thereto, a magnetic holding device selectively operable to a condition to engage and to a condition to release said work member for maintaining said work member in its last position, first switch means operable to a first and a second position for establishing a solenoid member energizing circuit for activating said actuator device to move said work member in a first and a second direction, respectively, and direction of motion determining circuitry including second switch means operated by said solenoid member responsive to the operation of said first switch means to said first position for operating said clutch device to the condition to engage and said holding device to the condition to release said work member at the beginning of each of said first direction power strokes and for operating said clutch device to the condition to release and said holding device to the condition to engage said work member and for interrupting said solenoid member energizing circuit before the beginning of each of said second direction power strokes and responsive to the operation of said first switch means to said second position for operating said clutch device to the condition to release and said holding device to the condition to engage said work member at the beginning of each of said first direction power strokes and for operating said clutch device to the condition to engage and said holding device to the condition to release said work member and for interrupting said solenoid member energizing circuit before the beginning of each of said second direction power strokes.

7. An electromechanical bi-directional motion actuator device comprising a source of electrical power, an electrical solenoid member characterized by the ability to produce first and second direction power strokes when energized by said source of electrical power, a movable work member of a magnetic material, a magnetic clutch device selectively operable to a condition to engage and to a condition to release said work member for selectively transferring the motion of said solenoid member thereto, a clutch device switching coil included in said magnetic clutch device for operating said clutch device to the condition to engage and the condition to release when energized, a magnetic holding device selectively operable to a condition to engage and to a condition to release said work member for maintaining said work member in its last position, a holding device switching coil included in said magnetic holding device for operating said holding device to the condition to engage and the condition to release when energized, switch means operable to a first and a second position for establishing a solenoid member energizing circuit thereby activating said actuator device to move said work member in a first and a second direction, respectively, and direction of motion determining circuitry responsive to the operation of said switch means to said first position for energizing said clutch device switching coil in a first direction for operating said clutch device to the condition to engage and for energizing said holding device switching coil in a first direction for operating said holding device to the condition to release said work member at the beginning of each of said first direction power strokes and for energizing said clutch device switching coil in a second direction for operating said clutch device to the condition to release and for energizing said holding device switching coil in a second direction for operating said holding device to the condition to engage said work member before the beginning of each of said second direction power strokes and responsive to the operation of said switch means to said second position for energizing said clutch device switching coil in a second direction for operating said clutch device to the condition to release and for energizing said holding device switching coil in a second direction for operating said holding device to the condition to engage said work member at the beginning of each of said first direction power strokes and for energizing said clutch device switching coil in a first direction for operating said clutch device to the condition to engage and for energizing said holding device switching coil in a first direction for operating said holding device to the condition to release said work member before the beginning of each of said second direction power strokes.

References Cited
UNITED STATES PATENTS

| | | | |
|---|---|---|---|
| 2,803,761 | 8/1957 | Young | 310—14 |
| 2,831,990 | 4/1958 | Young | 310—14 |
| 2,304,514 | 12/1942 | Sutton | 74—126 |

MILTON O. HIRSHFIELD, *Primary Examiner.*

D. F. DUGGAN, *Assistant Examiner.*